United States Patent Office 3,381,456
Patented May 7, 1968

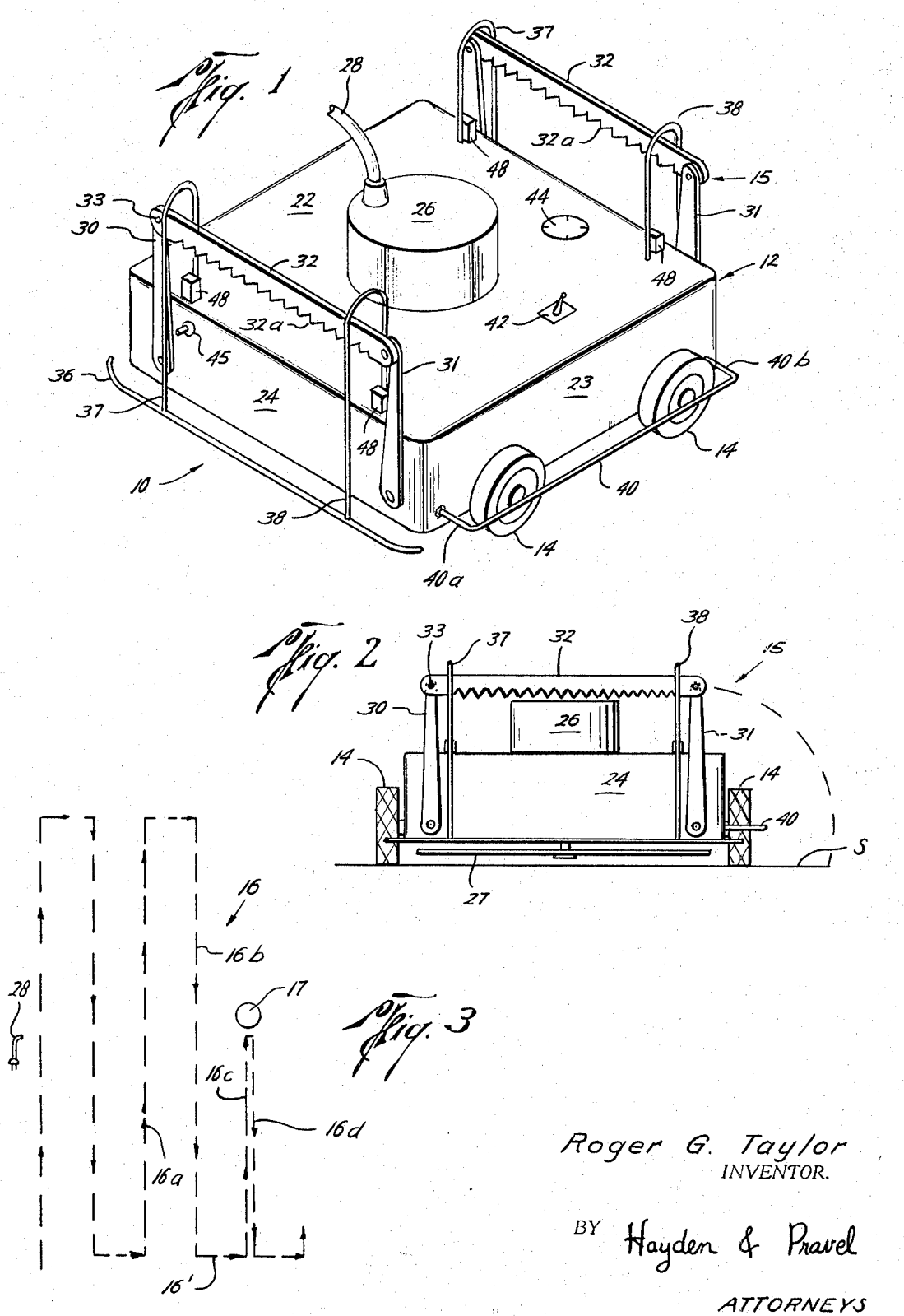

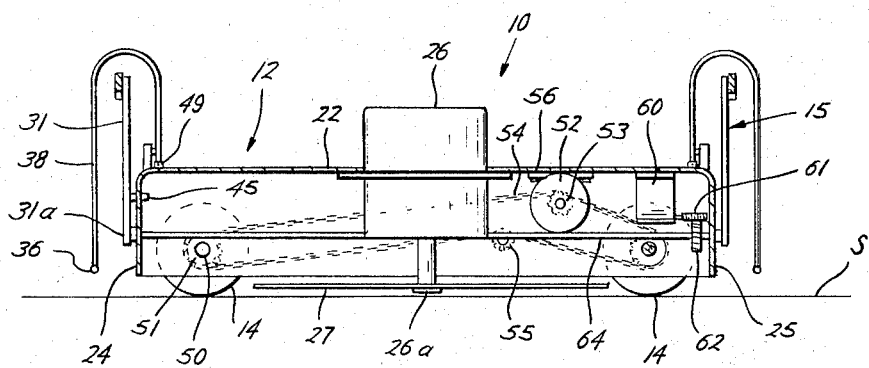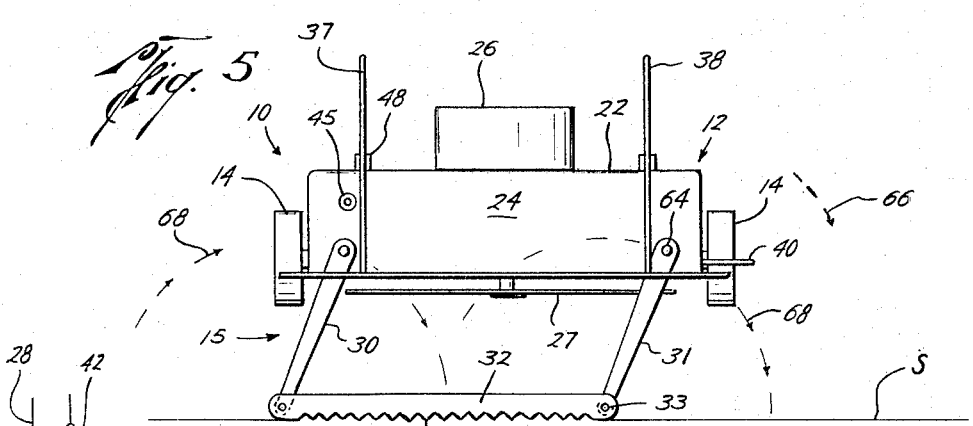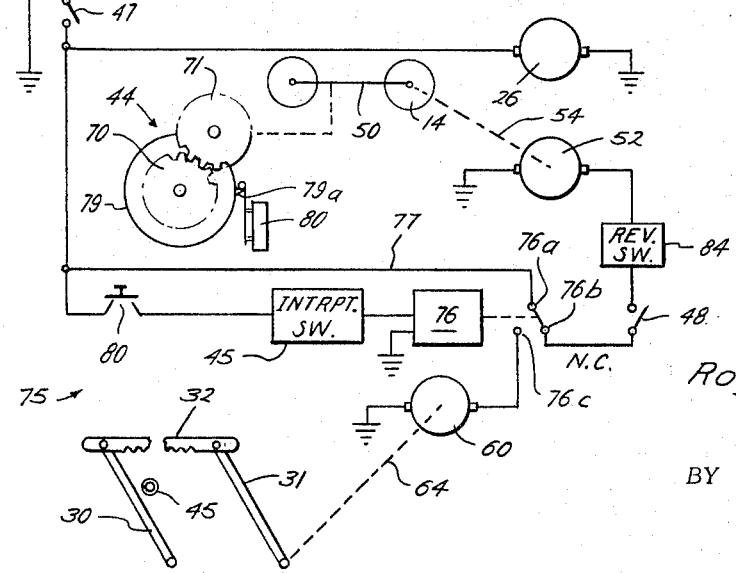

3,381,456
UNTETHERED, SELF-PROPELLED DEVICE OPERATING IN A PREDETERMINED PATTERN
Roger G. Taylor, 13815 Skyview,
Sugarland, Tex. 77478
Filed Sept. 7, 1965, Ser. No. 485,420
8 Claims. (Cl. 56—25.4)

This invention relates to a new and useful self-propelled, untethered device which operates in a predetermined pattern, and more particularly a cleaning device which traverses a pattern comprising multiple, parallel paths of movement on a surface which parallel paths are of equal length and equally spaced on the surface except when barred or interrupted by an obstacle whereupon the device interrupts its operation, starts a new path of movement which maintains the predetermined pattern.

Surfaces, speaking broadly, often evidence an obvious need of housekeeping chores to be performed in maintaining a neat appearance, preventive maintenance for adding life to the surface, or for cleaning and restoring purposes. One such example might lie in the tending and care of a lawn or other outdoor area. Lawns need grass cutting; in the fall of the year, leaves on the lawn need to be raked; and in the spring, lawn areas may need an application of fertilizer or other chemicals to invigorate the plants lying dormant after a winter's season. Such chores are commonly achieved by ambulatory movements in some pattern while operating a hand propelled device.

In door surfaces are also susceptible of rather routine and monotonous caretaking chores. For instance, carpeted areas may require vacuum cleaning and an occasional shampoo. Likewise, tile floors or the like may require an occasional coating of chemical preservatives or waxes. And, hardwood floors have occasion to be buffed to restore a high luster and sheen to the surface. As with the outdoor activities, it will be appreciated that the indoor housekeeping chores above enumerated, and many similar chores, are undertaken, not only for the sake of appearance of the surface area, but with the point of view of sustaining life of the surface and also preventing deterioration should the area go unattended.

Most surfaces are ideally considered an uninterrupted surface on which the desired treatment is performed although it will be recognized that in most instances that various obstacles are encountered. For instance, outdoor grassy surfaces are often interrupted with trees, fixtures, flower beds, poles, walks, and the like. Thus, while it is conventionally expected that the surface is not overly interspersed with obstacles, it is the norm to encounter some obstacles.

While the nature of obstacles on indoor surfaces varies from that of outdoor surfaces, they nevertheless are inherently found indoors. For instance, large rooms are often interspersed with quite large pieces of furniture, support columns, and other permanent installations. Thus, routine caretaking of an indoor surfaced area is also subject to interruptions.

Area surfaces requiring care and maintenance, whether indoors or outdoors, are quite often tastefully altered from rectangular form to include irregular edges as one means of easing the harshness of the conventional rectangular surface. As an example, a large indoor area of generally rectangular configuration may include appended alcoves, bay windows, or the like.

Outdoor surface areas are altered in a similar manner to include a curved edge, flower beds, border trim, and the like.

With a view of the above noted irregularities and the previously mentioned problems, it is an object of the present invention to provide an untethered, self-propelled device which operates on a surface, whether indoors or outdoors, in accordance with a predetermined pattern for carrying means to perform a housekeeping function on the surface.

One object of the present invention is to provide a new and improved device which traverses a predetermined pattern while yet having interrupt capabilities therewith which redirect the device to continue the predetermined pattern save only for that portion thereof interrupted.

A further object of the present invention is to provide a new and improved untethered device which moves in consecutive parallel paths and then displaces itself transversely at the end of each path of movement to commence a new parallel path of movement whereby the swath of the device extends over all of the area of the surface.

Still a further object of the present invention is to provide a new and improved device having a pair of support members with each carried on a pair of rotating arms which are located at the forward and rearward ends of the device to engage the surface therebelow and move the device transversely or laterally with respect to its customary direction of movement to effect a new path of operation parallel to and spaced from the previous path of operation.

Still another object of the present invention is to provide a new and improved self-propelled device which traverses a surface area while mowing grass, spreading chemicals, or the like wherein the length of operation of the device is adjustable to equal the width of the surface and the device operates along a plurality of parallel paths which moves said device over the entirety of the surface area.

Another object of the present invention is to provide a self-propelled lawn mower for use on rectangular and irregular areas.

One object of the present invention is to provide a new and improved device which moves to and fro over a surface area and advances perpendicularly systematically thereacross wherein swaths of operation of the device cover the entire surface area, and which device continues operation until interrupted by an obstacle defining the edge of the area.

Other objects and advantages of the present invention will become more readily apparent from an examination of the appended specification and drawings wherein:

FIG. 1 is a perspective view of the present invention which includes means providing movement along parallel paths on a surface;

FIG. 2 is an end view of the structure shown in FIG. 1 illustrating means providing transverse movement and means for cutting grass on an outdoor surface;

FIG. 3 is a pattern including a number of parallel paths of movement of the present invention wherein interruption of one of the parallel paths on encountering an obstacle is shown;

FIG. 4 is a side view of the device of the present invention with the side cover removed to illustrate greater detail;

FIG. 5 is an end view of the present invention moving transversely by engaging the surface therebelow; and FIG. 6 is a schematic diagram of the electric circuitry of the present invention which also relates mechanical portions of the present invention to the circuitry.

Attention is directed to the lawn mower indicated generally by the numeral 10 in FIG. 1, which lawn mower incorporates the present invention. The lawn mower 10 includes a structure denoted by the numeral 12 which resembles a frame having a suitable covering thereabout, and a plurality of wheels 14 carried on the frame 12 for movably supporting the frame with respect to a surface S. The frame 12 is moved on the surface by wheels 14 in response to operation of motive means, an electric motor in the preferred embodiment, which will be described in greater detail hereinafter. The frame 12 also carries means indicated generally at 15 for moving downwardly with respect to the surface S to engage the surface and thereby move the frame 12 transversely relative to the direction and movement provided by wheels 14. Switch means (to be described) are provided for reversing operation of the electric motor connected to the wheels 14 so that the lawn mower 10 moves back and forth on the surface to mow the grass or achieve any other housekeeping chore prescribed for the present invention. Control means are provided which measure the extent of movement of the frame 12 along a first path of movement, which terminate movement after a predetermined length of movement, and which initiate operation of the transverse means to place the invention 10 on a new path of movement which is parallel to and spaced from the previous path of movement.

Attention is directed to the FIG. 3 which illustrates a pattern indicated generally at 16, which pattern is representative of the pattern of movement required for mowing grass or performing other housekeeping chores relative to a given surface. The pattern 16 incorporates a plurality of parallel paths of movement of equal length wherein each of the paths is equally spaced from adjacent paths to cut a swath on the entire surface. It will be appreciated that the pattern 16 encompasses a rectangular area having a width equal to the length of the paths comprising the pattern and wherein the summation of the transverse movements of the device is the length of the area.

For purposes of description, it is preferable to identify a first path at 16a, a second path at 16b, a third path 16c and a fourth path 16d. It will be noted that between paths 16b and 16c the transverse movement indicated by 16' is effected by the present invention, and transverse movement 16' is representative of additional transverse movement effected at the termination of any one of the paths comprising the pattern of movement 16. Of particular interest to the present invention is the inclusion of an obstacle 17 in forward proximity of the path 16c which obstacle causes the self-propelled, untethered device 10 to initiate the parallel path 16d. The parallel path 16d preferably coincides with path 16c so that no lateral movements such as indicated at 16' is effected therebetween. The paths 16c and 16d in FIG. 3 are spaced apart only for purposes of illustration and do not indicate lateral movement of the device of this invention.

The present invention incorporates means which determines the near proximity of an obstacle on or about the surface and reacts to the obstacle such as the obstacle 17 by interrupting a path of movement during transition to retrace the interrupted path wherein the retraced movement is terminated at a point even with the point of initiation of the previous path of movement. That is to say, the device 10 simply retraces its steps and thereafter executes again transverse movement 16' to initiate a new path of movement. As will be appreciated by those skilled in the art, the obstacle 17 shown in FIG. 3 may be any such obstacle found in or about the surface which may interrupt only one path with respect to the pattern 16. On the other hand, the obstacle 17 may interrupt several parallel paths of movement as might occur when the surface S of the pattern of movement 16 is not rectangular but includes, perhaps, a curved edge wherein the device is initially adjusted to traverse the greatest width of the area and is interrupted by the curved edge.

Returning again to FIG. 1, the frame 12 has a preferably flat upper member 22 which is approximately square in shape and joined to a plurality of sides extending therebelow. A side 23 is provided adjacent the illustrated pair of wheels 14, and a pair of end surfaces 24 and 25 (see FIG. 4) is also included. Extending through the upper surface 22 is a housing 26 which is adapted to receive therein an electric motor for operating the rotary cutting blade 27 best seen in FIG. 2. The housing 26 is connected to a voltage source by a conductor 28, a portion of which is shown in FIG. 1, it being kept in mind that the conductor 28 extends to any required length. Reference is made to FIG. 3 wherein the connective fitting on the conductor 28 is located relative to the pattern 16 shown in FIG. 2 to indicate a point of connection which maintains the conductor 28 beyond the cutter blade 27 to prevent accidental severing of the conductor 28. As will be observed, the self-propelled device 10 of this invention advances with respect to the three sides 23, 24 and 25 and thereby provides a safe direction for extending the cable across the lawn mower 10 wherein it may safely be dragged across the surface S.

Referring again to FIG. 1, the means 15 includes at each end 24 and 25 of the lawn mower 10 rotatable arms 30 and 31. The arms 30 and 31 are connected at their outer ends to a support bar 32 equipped with serrations or teeth 32a which are adapted to increase the frictional contact of the support member 32 with the surface S. A pin 33 is placed in each end of the members 32 for pivotal connection with the arms 30 and 31.

A bumper 36 is carried in spaced relation to the surface S by a pair of U-shaped arms 37 and 38 forwardly of the end face 24 of the lawn mower 10 for detecting and indicating the near proximity of obstacles on such as the obstacle 17 shown in FIG. 3.

In addition a similar bumper 36 is provided adjacent the end face 25 wherein the bumpers 36 cooperate to provide detection of obstacles regardless of the direction of travel of the lawn mower 10.

The end of each path of movement is marked by transverse movement 16' wherein the lawn mower 10 advances in the direction of the side surface 23 illustrated in FIG. 1. A bumper 40 is carried exteriorly of the wheels 14 and is positioned to detect the near proximity of obstacles located to the side of the lawn mower 10 to interrupt operation of the lawn mower.

The lawn mower 10 is equipped with off-on switch 42 which is a master switch controlling the current provided by the conductor 28. In addition to the switch 42, there is also located on the upper surface 22 of the lawn mower 10 an adjustable distance measuring device indicated at 44. The device 44 provides control of the length of path 16a shown in FIG. 3 which thereby determines one dimension of the pattern 16. A switch 45 is placed in one of the end surfaces and protrudes toward the arm 30 and is contacted by the arm when the transverse means 15 is positioned in the upright position shown in FIG. 3. Briefly, the switch 45 interrupts operation of the arms 30 and 31 as they are rotated to maintain an upright position.

The side bumper 40 includes a side bumper switch 47 shown in FIG. 6 which is connected in series with the switch 42 to interrupt all current flow to the lawn mower 10. The switch 47 is preferably a push-button switch operating to the open circuit condition when the side bumper 40 is contacted against an obstacle and the end portions 40a and 40b of the side bumper 40 are urged toward the frame 12. It may be found desirable and advantageous to include two switches 47 with one connected to each of the end pieces 40a and 40b of the side bumper 40 so that movement of either end of the bumper 40 results in actuation of one of the switches 47. Such installation would involve the mounting of the end portions 40a and 40b slidably and axially aligned with the switches 47 with the end portions 40a and 40b received through suitable support and alignment openings and provided with slight spring biasing to maintain the side bumper 40 at the proper spacing relative to the frame 12 of the lawn mower.

The support arms 37 and 38 which suspend the bumpers 36 in spaced relation to the end faces 24 and 25 of the lawn mower 10 are each connected to the frame 12 by a pivotal connection 49 shown in FIG. 4. Positioned adjacent to the U-shaped support arms 37 and 38 is a switch 48 with four of the switches 48 shown in FIG. 1. The switches 48 are operated by movement of the U-shaped support arms 37 and 38. When the bumper 36 contacts an obstacle and is deflected towards the frame 12, the movement of the support arms relative to the pivots 49 will actuate the switches 48, resulting in a reversal of operation of the lawn mower 10 exemplified in FIG. 3 where the path 16c is terminated by the obstacle 17. More specifically, the switches 48 are of the push-to-interrupt type wherein the interruption is only momentary and does not depend on the time of deflection of the switch. In addition, the switches 48 are normally closed and are only momentarily interrupted to provide reversal of the lawn mower 10. The switches 48 are represented generically in FIG. 6, although it will be appreciated that the switches are wired in series just as the switches 47 provided on the side bumper 40 are wired in series.

Attention is next directed to FIG. 4 which illustrates internal detail of the present invention. The motor 26 has a downwardly projecting shaft 26a connected to the cutter blade 27 which is positioned parallel to and spaced from the surface S for cutting grass. The side faces are provided with spaced openings for receiving a pair of parallel axles 50 for mounting the wheels 14 to drive the lawn mower 10. The wheels 14 are fixedly attached to the axles 50 and a drive gear 51 is secured to each of axles 50 by means of the collar or the like to provide rotation of the wheels 14. The gears 51 lie on a common plane and are driven by a motor 52 provided with a drive gear 53 in the common plane. A link chain 54 connects the gear 53 to the gears 51, and the link chain 54 is maintained out of range of contact with the cutter 27 by means of an idler gear 55 mounted on a shaft secured to the frame 12. The motor 52 is suspended from the upper surface member 22 by means of bolts or the like and a mounting plate 56.

Forward motion of the lawn mower 10 of the present invention is provided by the rotation of the motor 52 and is bidirectional wherein reversal of the motor 52 also reverses the direction of rotation of the wheels 14.

An additional motor 60 provided with a drive gear 61 is engaged with a gear 62 mounted on a shaft 64 extending the length of the frame 12 and protruding beyond the end faces 24 and 25. Each end of the shaft 64 is received in openings in the end faces 24 and 25 and is engaged with the arms 31 by means of a collar 31a. The motor 60 rotates the shaft 64 to thereby rotate the arms 31 fixedly connected thereto to carry the support members 32 into contact wtih the surface S to move the lawn mower 10 transversely with respect to the direction of movement provided by the wheels 14. The arms 30 are also provided with a pivotal connection carried on the end faces 24 and 25, but it is not necessary to provide motive means to the arms 30 as they will rotate with the arms 31. The arms 31 are parallel to one another so that the contact of the support members 32 against the surface S during transverse movement is simultaneous whereby the lawn mower 10 is not canted on transverse displacement.

As will be described in greater detail hereinafter, the motor 60 is operated when control means measuring the length of path provided by the wheels 14 indicates the end of path and applies electrical power to the motor 60. The motor 60 operates for a measured interval and rotates the transverse means 15 for one revolution. The one revolution is terminated by the contact of the arms 30 with the switch 45 which is located relative to the transverse means 15 to position the arms upright as illustrated in the drawings.

For greater understanding of the transverse movement 16' of the lawn mower 10, attention is directed to FIG. 5 which illustrates the frame 12 lifted above the surface S by operation of the transverse means 15. The locus of movement of the arms is shown at 66 to indicate rotation of the pin 33 provided at the outer tip of the arm 31. Additionally, the locus of movement indicated by the semicircles 68 describes movement of the pivot points of the arms 30 and 31 as they are rotated in to the surface S. It will be noted that the relative dimensions of the arms 31 with respect to the swath cut by the cutter 27 is such that the extent of transverse movement 16' is less than the width of the swath cut by the cutter 27. In cutting grass on the surface S, adjacent paths of operation of the cutter 27, such as the paths 16a and 16b shown in FIG. 2 preferably overlap, and to this end, the above mentioned dimensional relationship is maintained for operation of the present invention.

Reference is next made to FIG. 6 which is an electromechanical schematic of the present invention which details construction of the control means provided herewith. In FIG. 6, the conductor 28 provides electrical power for operation of the present invention 10, which is operated by control circuitry indicated generally by the numeral 75. Control circuitry 75 is connected with the conductor 28, it being noted that the conductor 28 passes through the off-on switch 42 and through the switch 47 which is operated by the side bumper 40. Both switches 42 and 47 provide interruption of all power needed by the self-propelled device 10 which completely stops the lawn mower 10 of this invention. As previously stated, the switch 47 can be provided with any number of switches in series to interrupt operation on actuation of the side bumper 40.

The control circuitry 75 is provided with a relay 76 having a set of contacts, one contact 76a being connected by means of a conductor 77 to the conductor 28. The relay contact 76a is contacted in the unoperated position against the contact 76b and thereby provides electrical power, as will be described, to the wheel drive motor 52. On operation of the relay 76, the contact 76a is moved to relay contact 76c which is connected to the motor 60 to provide for rotation of the shaft 64 shown in FIG. 6 and in dotted line to represent the mechanical connection to the arms 31.

In control means 75, it should be noted that the motor 52 normally operates, and interruption of the motor 52 results in operation of the motor 60; operation of one of the motors 52 and 60 is mutually exclusive to operation of the other motor.

The distance measuring means 44 related previously with respect to FIG. 1 as providing controlled excursion of the lawn mower 10 is illustrated in FIG. 6 as including a mechanical linkage operated by the drive axles 50. The mechanical means 44 provides an adjustable gear ratio between the axles 50 and a cam 79. The means 44 is adjusted for a given range of operation of the lawn mower 10 by adjusting the ratio of the gears providing the interconnection between the axle 50 and the cam 79. In this regard, FIG. 6 illustrates the cam wheel 79 mounted on a common shaft with a gear 70, which gear 70 is driven by a gear 71 representative of the gear train connecting with the axle 50. As will be appreciated by those skilled in the art, the number of gears provided in the train is not critical and, as a matter of fact, belt drives or the like can be provided communicating with the cam 79.

Rotation of the axles 50 causes movement of a known distance of the lawn mower 10 and the gears 71 can be provided to accommodate one revolution on the cam 79 during the movement. By way of example and not limitation, if the wheels 14 are slightly less than four inches in diameter, it can be calculated that one revolution of the axle 50 will provide one foot of translation to the lawn mower 10. If it is desired that the lawn mower 10 should mow along a path 16a which is fifty feet in length, it is then expeditious to obtain only one revolution of the cam 79 for every fifty revolutions of the axle 50. This is accomplished by maintaining a 50 to 1 stepdown gear ratio in the gears 70 and 71. By way of further example, if a yard is sixty-four feet wide, a 64 to 1 stepdown ratio in the gear train will limit the range of the mower 10. This may be accommodated by including two eight to one gear ratios in the gears 70 and 71 communicating with the cam 79. Of course, the gear train 71 need not communicate directly with the axles 50 but may be engaged with the drive chain 54 shown in FIG. 4 since the movement of the drive chain 54 is directly proportional to the rotation of the axles 50. In any event, those skilled in the art will appreciate that the rate of rotation of the wheels 14 is related to the rate of rotation of the cam 79.

The cam 79 is provided with a cam lobe 79a which projects therefrom to contact and actuate a microswitch 80. The microswitch 80 is shown somewhat pictorially in FIG. 6 to provide spatial relationship to the cam 79 and it is also indicated schematically connected to control the relay 76. On operation of the switch 80 to the closed position, a circuit is made communicating electrical power, as will be explained, to the relay 76 which pulls the contact 76a away from the relay contact 76b. Current flow to the wheel drive motor 52 is interrupted to halt further rotation of the wheels 14 whereupon the cam 79 is maintained in the position which holds the switch 80 in the closed position. The switch 80 is communicated with the interrupt switch 45. The interrupt switch 45 is connected to the armature 76 of the relay and the operation of the two switches connected in series with the relay control operation of the wheel motor 52.

The interrupt switch 45 is, as previously mentioned, a push-to-interrupt switch which provides an interruption for a specific interval. By way of example, if the switch 45 provides a 30 second interruption before it remakes, the relay 76 has sufficient time to apply current to the wheel motor 52 and thereby move the lawn mower 10 along a new path. Such movement moves the cam lobe 79a from the switch 80 to open the relay circuit. An acceptable model of the interrupt switch 45 is manufactured by Micro Switch, a division of Honeywell, and is designated model 1PD1. Thus, it is sufficient that the interrupt switch maintain an interruption only for an interval of time wherein the microswitch 80 is opened.

The path 16d which is traversed after interruption is equal in extent of movement to the path 16c because of operation of control means 75. More specifically, reversal of the wheels 14 and the axles 50 reverses the direction of the rotation of the cam 79. When the cam lobe 79a moves away from the microswitch 80 and opens same and the extent of rotation is fixed by an obstacle, the rotation away from the microswitch 80 is equal to the rotation required to return the cam lobe 79a to contact the microswitch 80 and reclose it.

Provision for operation in two directions as indicated by the paths 16a and 16b shown in FIG. 3, lies in a reversing switch 84, one model of which is manufactured by Micro Switch, a division of Honeywell, Model No. 82PB19-T2. The reversing switch 84 is preferably a DPDT switch including integral means therewith for reversing connection of the switch in the circuitry when electrical power is interrupted. Thus, interruption of electrical power by the relay 76 causes the reversing switch 84 to reverse the power connections of the motor 52. The motor 52 is then operated in the reverse direction to move the device 10 along the path of movement 16b which is parallel to and spaced from the path 16a. The plurality of normally closed interrupt switch means 48 is connected in series with the reversing switch 84. Switches 48 are manufactured by Micro Switch, a division of Honeywell and designated as Model No. 9BS1 or 1PD1 and are preferably push-to-interrupt switches which provide only a momentary interruption of sufficient duration to actuate the reversing switch 84 when power is reapplied to the switch 84. Thus, it will be recognized that in the preferred embodiment, five series switches are provided in the electrical conductor 77 communicating with the reversing switch 84, any one of which can reverse the wheel drive motor 52. One of the five switches is the relay 76 which reverses operation of the motor 52 after the transverse movement 16' and the other four are switches 48 operated by bumper means 36 as previously described.

The lawn mower 10 continues the pattern 16 to whatever extent is found necessary to sweep out the housekeeping functions of the surface S. As the lawn mower 10 continues to oscillate to and fro and moves in one direction to the side, it will be appreciated that the surface S is fully treated to whatever extent is desired. On reaching an obstacle on the side 23 of the lawn mower 10 having the side bumper 40, the lawn mower 10 will bump or otherwise contact the obstacle facing the advancing side with the bumper 40 and actuate the switch 47 to interrupt power flow to the device and stop the self-propelled device 10.

It should be noted in the foregoing that the possibility exists that the device might contact an obstacle during transverse movement of the frame 12 wherein the frame 12 is some distance above the surface S. Such contact would operate through the control circuitry 75, even during transverse movement, to stop the present invention.

In operation, the present invention is prepared for operation along the pattern 16 shown in FIG. 3 by placing the lawn mower 10 preferably at the corner of a plot of grass to be mowed. The surface S is treated as being rectangular for purposes of preparation although the present invention includes means responding to the edges or borders of a plot having nonparallel sides. In any event, the maximum distance desired for operation of the lawn mower 10 along a path 16a is determined and the distance measuring means 44 is adjusted to provide such a path of operation. The distance is determined and the gear train 71 is adjusted to provide the desired extent of movement. This may require changing of the gears in the train 71. The cam 79 is then moved to a point immediately adjacent the microswitch 80 where the cam lobe 79a is just short of actuating the microswitch 80. Positioning registers the cam 79 relative to the wheels 14 so that the first path of operation of the lawn mower 10 can be initiated at a known point with a predetermined range. Of course, the cam lobe 79a is positioned to rotate out of proximity of the microswitch 80 so that it will fully circle about the cam 79 and contact the microswitch 80 at the completion of the path of operation of the lawn mower 10.

The off-on switch 42 is operated to the on position to apply electrical power through the conductor 77 to the wheel motor 52 to drive the lawn mower 10 of this invention. If the reverse switch 84 should be such that the motor 52 rotates in the wrong direction, one of the bumpers 36 may be gently touched to operate the interrupt switch 48 which reverses the switch 84 to provide operation in the right direction. The cutter motor 26 is started when the switch 42 is operated and the drive wheels 52 move the lawn mower 10 along the desired path of operation.

The lawn mower mows along the path 16a (considered the first path) and on reaching the predetermined length of travel, the cam 79 rotates the cam lobe 79a against the microswitch 80 to terminate movement along the desired swath of operation. As recognized from the schematic view of FIG. 6, the microswitch 80 is operated and applies electrical power through the end-of-cycle switch 45 to the relay 76. The relay 76 applies electrical power in the conductor 77 to the relay contact 76c which communicates with the arm motor 60 to initiate operation of the transverse means 15. The motor 60 rotates the shaft 64 extending through the frame 12 and connected to each of the arms 31 which carries the support members 32 downwardly and into contact with the surface S. Contact of the support members 32 with the surface S is aided by the serrations 32a and continued rotation of the shaft 64 lifts the frame 12 relative to the surface S and moves same transversely a predetermined distance as will be appreciated when viewing the semicircular locus of points 68 shown in FIG. 5. The frame 12 is rested on the surface S after the transverse movement 16' and the arms continue to rotate, returning to an upright position illustrated in the drawings. On achieving an upright position, the arm 30 moves in front of the end-of-cycle switch 45, a push-to-interrupt switch, which provides an interruption in the circuitry controlling operation of the relay 76.

Referring again to FIG. 3, one revolution of the cam 79 is associated with the first path of movement 16a which is terminated on actuation of the microswitch 80 by the cam lobe 79a. Conversely, the second path of movement 16b is also associated with one revolution of the cam 79 but the second revolution is in the reverse direction and moves the cam lobe 79a away from the microswitch in the previous direction of approach and returns it to the other side of the microswitch after one revolution.

Should the lawn mower 10 come into near proximity of an obstacle, contact against one of the bumpers is sufficient to actuate one of the bumper switches 48 and interrupt current to the reversing switch 84. Switch 84 reverses current flow to the wheel drive motor 52 whereupon the lawn mower 10 operates in the opposite direction. Referring to FIG. 3, it will be noted that the path 16c which is interrupted by the obstacle 17 is duplicated by the path 16d which returns the lawn mower 10 to a point located with respect to the pattern 16 on the surface S permitting continuation of the rectilinear movements.

Alterations may be incorporated in the present invention without departing from the scope of the appended claims. For one thing, the device 10 includes a lawn mower operated by an electric motor 26 and having a cutter blade 27 beneath the frame 12 which cuts grass growing on the surface S. Clearly, the frame 12 is adapted to incorporate means performing other tasks with respect to the surface S. As an example, it is often necessary to buff and polish hardwood or tile floors. The present invention provides a vehicle for transporting a buffer wheel for dressing a floor surface in a regular pattern as described herein. Those skilled in the art may incorporate other means such as vacuum cleaners, chemical applicators and the like for performing housekeeping functions with the present invention.

The present invention incorporates transverse means 15 which rotate downwardly to contact the surface S with the support members 32 for moving the device 10 laterally of the path of movement. Those skilled in the art will recognize that endless track drives movable downwardly to the surface S can be used advantageously in the device 10. Specifically, an endless track extending between a pair of wheels carried on each end of the frame 12 wherein the endless track mechanism is mounted to move upwardly and downwardly to the endless tracks with the surface S will move the frame transversely.

Reference is made to FIG. 4 wherein various alterations might be incorporated. For instance, it may not be necessary to drive both axles 50 and rotation of only one axle 50 is adequate. Also, connection of the motor 52 to the axle 50 by flexible drive, gears or the like may be included.

The gear train 44 may be provided with a fixed ratio between the cam 79 and the axle 50 while the cam 79 has two cam lobes, one of which is movable. Adjustment of the movable lobe relative to the fixed lobe will proportion the circumference to represent an adjustable extent of movement. The circumferential edge of the cam 79 may be marked with gradations relating to a maximum distance occurring only on one full revolution. Location of the movable lobe relative to one of the gradation marks may be provided on the exterior of the cam by a cam lobe including a lock device. Therefore, two cam lobes would limit rotation of the cam 79 and operation of the present invention along a path of movement of predetermined length.

As a further alternative to provide controlled extent of movement of the lawn mower 10 of this invention with respect to the surface S, the means 44 may be provided with an adjustable belt drive system.

The foregoing disclosure and description of the invention is illustrative and explanatory thereof and various changes in the size, shape, and materials, as well as in the details of the illustrated construction, may be made within the scope of the appended claims without departing from the spirit of the invention.

What is claimed is:

1. An untethered self-propelled device operating in a predetermined pattern, comprising:
   (a) a frame;
   (b) a plurality of wheels carried on said frame for movably supporting said frame on a surface;
   (c) motive means operably connected to said wheels for driving same to translate said frame relative to the surface in a first path of movement;
   (d) means carried on said frame for moving downwardly to contact the surface and engage same, said means also moving said frame transversely relative to the direction of the first path by a predetermined distance;
   (e) switch means for reversing the direction of operation of said wheels relative to the surface for urging said frame along a second path of movement on the surface parallel to the first path; and
   (f) control means for measuring the extent of movement of said frame along the first path to limit said first path to a predetermined length and for actuating said means for moving said frame transversely whereupon said switch means reverses the direction of operation of said wheels to move said frame along the second path.

2. An untethered self-propelled device operating in a predetermined pattern, comprising:
   (a) a frame;
   (b) a plurality of wheels carried on said frame for movably supporting said frame on a surface;
   (c) motive means operably connected to said wheels for driving same to translate said frame relative to the surface in a first path of movement;
   (d) means carried on said frame for moving downwardly to contact the surface and engage same, said means also moving said frame transversely relative to the direction of the first path by a predetermined distance;
   (e) switch means for reversing the direction of operation of said wheels relative to the surface for urging said frame along a second path of movement on the surface parallel to the first path;
   (f) control means for measuring the extent of movement of said frame along the first path to limit said first path to a predetermined length and for actuating said means for moving said frame transversely whereupon said switch means reverses the direction of operation of said wheels to move said frame along the second path;
   (g) said control means also measuring the extent of movement of said frame along the second path to limit the second path to a predetermined length and also actuating said means for moving said frame transversely whereupon said switch means reverses the direction of operation of said wheels to move said frame along a third path parallel to and spaced from the second path; and
   (h) said control means providing equal extent of movement along the first path and the second path whereby the extent of movement of said frame relative to the surface on any path is equal thereto and said frame is thereby operated within predetermined limits relative to the surface.

3. The invention of claim 2 including:
   (a) interrupt means operable by movement of said frame in forward proximity of an obstacle in or upon the surface to thereby interrupt movement of said frame along a path of movement after having travelled therealong less than the predetermined length provided by said control means, and said switch means reverses the direction of operation of said wheels to move said frame on a new path of movement parallel to and spaced from the previous path of movement; and (b) said control means providing movement along the new path of movement equal in extent of movement to that of the previous path of movement prior to operation of said interrupt means whereby said means for moving said frame transversely is operated to place said frame in position for movement a predetermined distance from the new path and whereupon said switch means reverses the direction of operation of said wheels whereby said frame is operated within predetermined limits relative to the surface and any path of movement thereon which is subject to an obstacle in forward proximity of said frame is interrupted and maintained within predetermined limits relative to the surface.

4. The invention of claim 3 including second means operable during movement of said frame transversely of a path of movement during which transverse movement in adjacent proximity of an obstacle in or upon the surface to thereby interrup operation of said means and said motive means.

5. An untethered self-propelled device, comprising:
(a) a frame;
(b) a plurality of wheels carried on said frame for movably supporting said frame on a surface;
(c) a motor operably connected to said wheels for driving same to translate said frame relative to the surface;
(d) means carried on said frame for contacting the surface and supporting said frame;
(e) motive means connected to said last named means for operably supporting and moving said frame laterally with respect to the direction of travel provided by said wheels;
(f) detector means carried forwardly and rearwardly of said frame for detecting obstacles on the surface in forward and rearward proximity of said frame and in the direction of travel provided by operation of said wheels;
(g) control means operable in response to said detector means for interrupting operation of said wheels in providing movement in the direction of travel, and thereafter operating said wheels in a reverse direction to provide a new direction of travel parallel to and opposite in direction to the initial direction of travel provided by said wheels; and
(h) second detector means carried on said frame and positioned to indicate near proximity of an obstacle on the surface as approached by said frame during lateral movement as provided by said means, said second means operably connected to halt operation of the untethered, self-propelled device on detection of an obstacle.

6. A lawn mower comprising:
(a) a frame;
(b) a plurality of wheels carried by said frame for movably supporting said frame on a surface;
(c) an electric motor connected to said wheels for propelling said frame on the surface;
(d) oscillatory arms carried on the forward and rearward sides of said frame for rotating and contacting the surface to lift said frame and move same transversely with respect to the direction of travel provided by said wheels;
(e) grass cutting means carried by said frame and positioned for operation parallel to and spaced from the surface;
(f) a reversing switch connected to said motor and said wheels for reversing the direction of movement of said frame on the surface;
(g) control means for measuring the extent of movement of said frame along the first path provided by rotation of said wheels to limit the first path to a predetermined length and for actuating said oscillatory arms moving said frame transversely for operation along a second path;
(h) said control means operating said reversing switch after said oscillatory arms move said frame for operation along the second path whereby the second path is adjacent to and spaced from the first path;
(i) said control means also measuring the extent of movement of said frame along the second path to limit the second path to a predetermined length; and
(j) said oscillatory arms providing transverse movement of a predetermined length to permit overlapping operation of said grass cutting means on movement of said frame along the first path and the second path.

7. The invention of claim 6 including:
(a) bumpers carried rearwardly and forwardly of said frame for contacting obstacles on the surface in the path of said frame; and
(b) interrupt means operated by said bumpers for interrupting movement of said frame along a path and for initiating operation of said wheels to move said frame along a new path after operation of said reversing switch.

8. The invention of claim 7 including means cooperating with said control means for controlling the extent of movement along a new path of movement after operation of said interrupt means on sensing an obstacle in the path of said frame, said means providing termination of the new path of movement at a point even with and spaced from the point of initiation of the previous path of movement.

References Cited
UNITED STATES PATENTS

| | | | |
|---|---|---|---|
| 2,815,633 | 12/1957 | Meyer | 56—25.4 |
| 2,847,077 | 8/1958 | Vaughn | 180—79.1 |
| 2,941,346 | 6/1960 | Perry | 56—26 |
| 3,061,035 | 10/1962 | King | 180—79.1 |

ANTONIO F. GUIDA, *Primary Examiner.*